3,133,960
RECOVERY AND PURIFICATION OF NAPHTHENIC ACIDS

Scott P. Ewing, Jr., Tulsa, Okla., and Edward G. Baker, Berkeley Heights, N.J., assignors to Esso Research and Engineering Company, a corporation of Delaware
No Drawing. Filed May 15, 1961, Ser. No. 109,840
5 Claims. (Cl. 260—514)

The present invention relates to the separation and purification of naphthenic acids. More particularly the invention concerns the production of high quality naphthenic acids.

Naphthenic acids are higher molecular weight aliphatic and cyclic hydrocarbon carboxylic acids that are usually obtained by treating a naphthenic crude oil or fractions thereof with a caustic solution to form sodium naphthenates that are soluble in the aqueous solution. The water layer is separated from the hydrocarbon layer and the former is treated with a mineral acid; e.g., sulfuric acid, to convert the soaps to naphthenic acids. The naphthenic acids so obtained are contaminated with substantial quantities of nonsaponifiable oily substances which can partly be removed by distillation. Distillation methods are not entirely satisfactory, especially when it is desirable to sell acids that are essentially free of non-acidic constituents. The principal contaminants are the hydrocarbons that are emulsified by the naphthenate soaps when the oil is treated with caustic. In some instances the aqueous solution recovered contains up to 70 wt. percent, based on the soap, of nonsaponifiable material. Settling helps to rid the aqueous layer of most of the oil, but complete purification, even when the product is distilled, is seldom achieved.

It has now been found that pure naphthenic acids essentially free of nonsaponifiables can be gotten by a sorption process wherein naphthenates are selectively removed from an aqueous solution by a finely divided water-insoluble solid thereby freeing the hydrocarbon contaminant to float on the top of the water. The oil is removed from the surface of the water and thereafter the naphthenate is released from the solid and recovered in a pure form.

The key to the process is the discovery that water-soluble naphthenates, especially the alkali metal soaps, are initially completely adsorbed on finely divided solids having moderate surface areas, but thereafter at least a portion of the soap returns to the water phase which contains the solid particles. While the mechanism of the adsorption is not fully understood it is believed that the soap molecules involved in micelle formation are reversibly adsorbed on the solid particles and therefore can easily be recovered after the nonsaponifiable material has been skimmed off or otherwise taken from the surface of the water. This does not seem to be true with regard to the free soap; i.e., the naphthenate molecules which are not a part of a micellar aggregate. The free soap is difficult to desorb from the solid. Therefore, it is beneficial in carrying out the process to promote the formation of micelles. This can be accomplished in several ways by known techniques, including the addition of salt and adjusting the temperature of the liquid to about 40° to 50° C.

In carrying out the present invention, unrefined naphthenates obtained from any of the known sources, e.g. a Colombian or Venezuelan crude or formation waters contaminated with naphthenates, are converted to alkali metal soaps, if they are not already in that form, and an aqueous solution thereof is contacted with a finely divided, preferably porous, solid that is capable of adsorbing the soluble naphthenate. As the soap is adsorbed on the surface of the particles, hydrocarbon droplets begin to form and float to the surface of the water. After a short period of time, usually in about 5 minutes to 5 hours, essentially all of the oil that was emulsified in the water is in a form that can be removed from the surface of the liquid without difficulty. For instance, the upper oil layer can be separated from the water by letting it flow over a weir or skimming it off the water's surface. Thereafter the naphthenate commences to reform micelles as it returns to the water phase. It is important to remove the oil before any significant amount of soap is desorbed, otherwise some of the hydrocarbon constituents will be re-emulsified.

The adsorption is preferably effected at slightly elevated temperatures with solutions containing at least 60 wt. percent of the soap in micelle form. The soap is rapidly and completely adsorbed at these temperatures which also favor the formation of micelles. Pressure is not an important condition, but the soap concentration is a material factor since this affects not only adsorption but also micelle formation. While substantially any soap concentration can be used in the process, it is advisable to utilize soap solutions containing at least 0.01 wt. percent naphthenate, and preferably between 0.1 and 2 wt. percent. If desired very concentrated solutions, e.g. up to 5 wt. percent, can be employed, but these are difficult to work with because they require the use of considerable quantities of adsorbent.

The adsorption occurs rapidly and is usually complete within about 60 minutes provided there is sufficient surface area available on the solid. Agitation, such as shaking or stirring, promotes the sorption phenomenon. Once the soap is on the surface of the solid, the adsorbent can be separated from the solution and the adsorbent naphthenate can then be released in another portion of water. Alternatively, the finely divided solid can be left in contact with the water from which it obtained the soap so that the desorbed substances return to the same medium. The complete cycle, that is the adsorption and release of the soap, generally takes place over a period of hours, e.g. 5 to 50 hours. The time can be shortened or lengthened depending upon the conditions employed. For example, the temperature of the solution can be increased following the removal of the nonsaponifiables to increase the desorption rate. By resorting to such methods, the desorption can be more quickly effected. Under optimum conditions, the cycle time can be reduced to about an hour. The released soap can be recovered from the water by any of the conventional methods, such as acidifying the liquid to precipitate the acid and then filtering the slurry.

The naphthenic acids purified by this process are essentially pure. They consist mainly of $C_{10}$ to $C_{16}$ saturated monobasic acids that have densities in the range of about 0.90 to 0.95, boil between about 100° and 350° C. at 1 mm. absolute pressure and have average acid numbers of 220 to 240. In contradistinction to the dark colored acids gotten by other processes, these acids are colorless and do not have the disagreeable odor characteristic of impure acids. In addition to being useful in the production of heavy metal salts that are widely employed as paint driers, the acids are also utilized to make emulsifying agents, wood preservatives and gelling agents.

The most effective adsorbents for use in this invention are the sands and clays that have moderate surface areas. The solid must, of course, be in a finely divided state; i.e., have an average diameter of about 0.01 to 20 mm., and possess a surface area that is at least 1 square meter/g. While surface areas of up to 500 square meters/g. are useful, the preferred solids have particle sizes of 0.1 to 1 mm. and surface areas in the range of 3 to 20 square meters/g. (as measured by the B.E.T. nitrogen adsorption method). Among the mineral grains that can be utilized are alumina and siliceous substances, such as quartz, sandstone, pea pebble, bentonite, montmorillonite, kaolin, fuller's earth of Georgia and spent alumina cracking catalysts. Other silica- and alumina-containing particulate solids can also be used. Usually 10 to 1000 parts by weight of adsorbent are used per part by weight of naphthenate.

In a preferred embodiment of the invention, a 0.10 to 2.0 wt. percent solution of crude lithium or sodium naphthenate is adjusted to a pH of 8.5 and warmed to between 40° and 50° C. to obtain a miscelle concentration of about 60 to 90% of the total soap and admixed with a finely divided porous solid adsorbent (50 to 150 parts by weight per part of naphthenate). The alkaline solution is thereafter agitated for approximately one hour. The hydrocarbon layer that forms on the surface is then skimmed off while the solution is quiescent. Next the temperature of the solution is raised about 75° and agitated again for about 10 to 20 hours while the adsorption process is reversed. At the end of this time the solution is filtered or centrifuged and decanted and the clear liquid is acidified with concentrated sulfuric acid and the high grade water-insoluble acid product is recovered.

In addition to purifying acids that naturally occur in crude oils, the process has application to the recovery of naphthenic acids from formation or ground waters that contain small amounts of naphthenates, e.g. 1 to 10 grams/liter. If desired, said formation or ground waters can be concentrated, e.g., by distillation, before treating them in accordance with the invention.

The process will be better understood by referring to the following examples:

Example 1

To each of two crude sodium naphthenate solutions (50 ml. of 0.01 and 0.5 wt. percent solutions) adjusted to pH 8.5, is added 5 gram portions of Weiler sandstone having a surface area of 11 square meters per gram and containing about 2 wt. percent clay minerals. The mixtures are shaken at room temperature and within a few minutes oil droplets begin floating to the surface of the water. An hour later the water is sampled and no soap is found. The oil layer (about 0.04 ml. in the water containing the more concentrated solution) is skimmed off the quiescent water's surface and the mixtures free of hydrocarbon are again shaken, this time overnight. The next day (about 20 hours later) each aqueous solution is filtered, acidified with 0.1 N sulfuric acid and the insoluble naphthenic acids released are recovered. The acids are extracted from the water with petroleum ether and dried in a vacuum desiccator. The acids yields are 50 and 70%, the yield being greater for the more concentrated soap solution. The acids are colorless and contain less than 1 wt. percent nonsaponifiables. This represents about a 95% reduction in hydrocarbon contaminant.

Example 2

A more concentrated crude alkali metal naphthenate solution can be treated in an analogous manner. For example, 50 ml. of a 5 wt. percent sodium naphthenate solution is contacted with 200 g. of the sandstone used in Example 1 and an additional quantity of water (between 200 and 500 ml.) is added so as to facilitate shaking and separation of the released nonsaponifiable impurities. After shaking about 30 minutes to one hour at 40–50° C., the system is allowed to settle whereupon the oily impurities (about 0.5 ml. in the present example) are removed as before. In the following 24 hours most of the adsorbed soap (90%) reenters the water phase whereupon the organic acids are released by acidification and removed by solvent extraction, as described in the previous example.

Example 3

Example 2 is repeated with montmorillonite having a surface area of about 10 square meters per gram.

It is not intended to restrict the present invention to the foregoing embodiments, but rather it should only be limited by the appended claims in which it is intended to claim all the novelty inherent in the invention.

What is claimed is:

1. Process for purifying naphthenates which comprises contacting an aqueous solution containing up to 5 wt. percent of water soluble alkali metal naphthenates contaminated with non-saponifiables, said naphthenates being mainly in form of mycelles, with an adsorbent solid capable of adsorbing the soluble naphthenates, said adsorbent solid having an average diameter of about 0.01 to 20 mm. and a surface area of at least one square meter per gram until a substantial portion of the naphthenates are selectively adsorbed on the solid, thereby releasing non-saponifiables which float to the surface of the aqueous liquid medium, removing the unadsorbed non-saponifiables from the surface of said aqueous liquid medium, allowing the adsorbent containing the adsorbed naphthenates to stand for a length of time sufficient to release the naphthenates into aqueous liquid essentially free of said non-saponifiable contaminants and recovering purified naphthenates from said liquid.

2. Process according to claim 1 in which the adsorbent solid, capable of adsorbing the soluble naphthenates, has an average diameter of about 0.1 to 1.0 mm. and a surface area in the range of 3 to 20 centimeters per gram.

3. Process according to claim 1 in which the aqueous solution contains between 0.1 and 2.0 wt. of alkali metal naphthenates at least 60% of which contaminated naphthenates in the liquid are in the form of micelles.

4. Process according to claim 1 in which the adsorption takes place at a temperature of about 40 to 50° C.

5. Process for purifying naphthenates which comprises contacting a dilute aqueous solution containing between about 0.1 and 2.0 wt. percent of water soluble alkali metal naphthenates mainly in mycelle form contaminated with non-saponifiables with 10 to 1,000 parts by weight of a finely divided porous solid adsorbent capable of adsorbing the soluble naphthenates, said solid adsorbent having a surface area of at least one square meter per gram at a temperature of about 40 to 50° C. until essentially all of the naphthenates are selectively adsorbed on the solid, thereby releasing the non-saponifiables from the mycelles forming droplets of the non-saponifiables which float to the surface of the liquid aqueous medium, removing the unadsorbed non-saponifiables from the surface of said liquid medium, allowing the adsorbent containing the adsorbed naphthenates to stand for a length of time sufficient to release the naphthenates into an aqueous liquid essentially free of said contaminants and recovering purified naphthenates from said liquid.

References Cited in the file of this patent

UNITED STATES PATENTS

| | | |
|---|---|---|
| 2,331,244 | Strickland | Oct. 5, 1943 |
| 2,723,596 | Strickland | May 8, 1945 |
| 2,723,289 | Mills | Nov. 8, 1955 |
| 2,789,081 | Mills | Apr. 16, 1957 |
| 3,034,980 | Honeycutt | May 15, 1962 |